Nov. 7, 1939.  W. E. EWART  2,178,784

VARIABLE SPEED TRANSMISSION

Filed Nov. 17, 1937  5 Sheets-Sheet 1

INVENTOR
William E. Ewart
BY
Smith Tuck
ATTORNEYS

Nov. 7, 1939.    W. E. EWART    2,178,784
VARIABLE SPEED TRANSMISSION
Filed Nov. 17, 1937    5 Sheets-Sheet 2
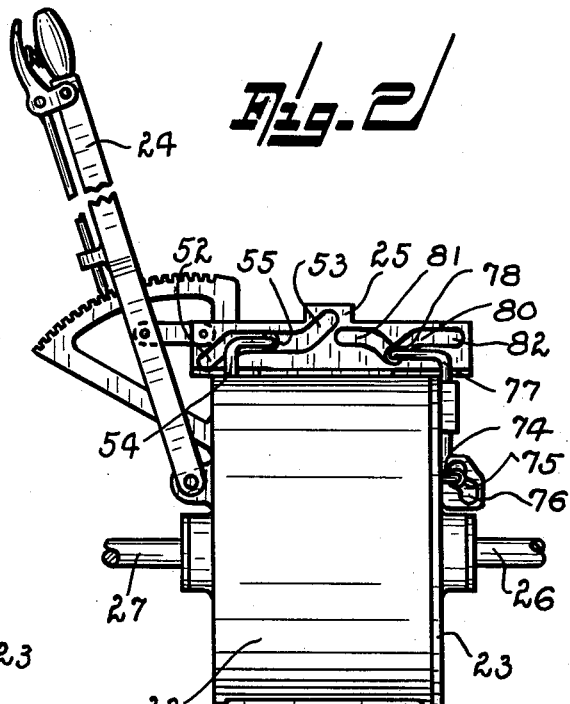
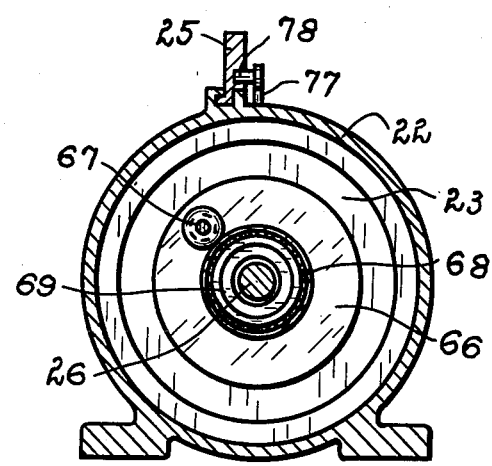
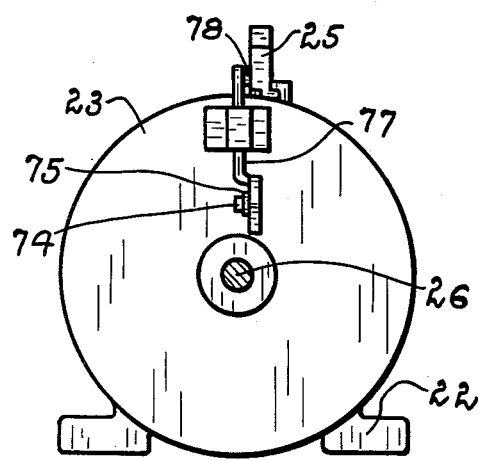
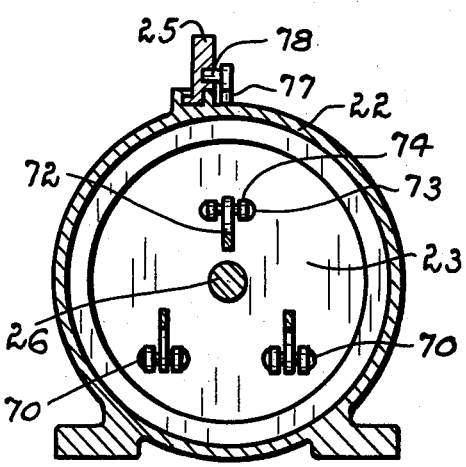
INVENTOR
William E. Ewart
BY
Smith & Tuck
ATTORNEYS Nov. 7, 1939.  W. E. EWART  2,178,784
VARIABLE SPEED TRANSMISSION
Filed Nov. 17, 1937   5 Sheets-Sheet 3

INVENTOR
William E. Ewart
BY
Smith & Tuck
ATTORNEYS

Nov. 7, 1939.   W. E. EWART   2,178,784
VARIABLE SPEED TRANSMISSION
Filed Nov. 17, 1937   5 Sheets-Sheet 4
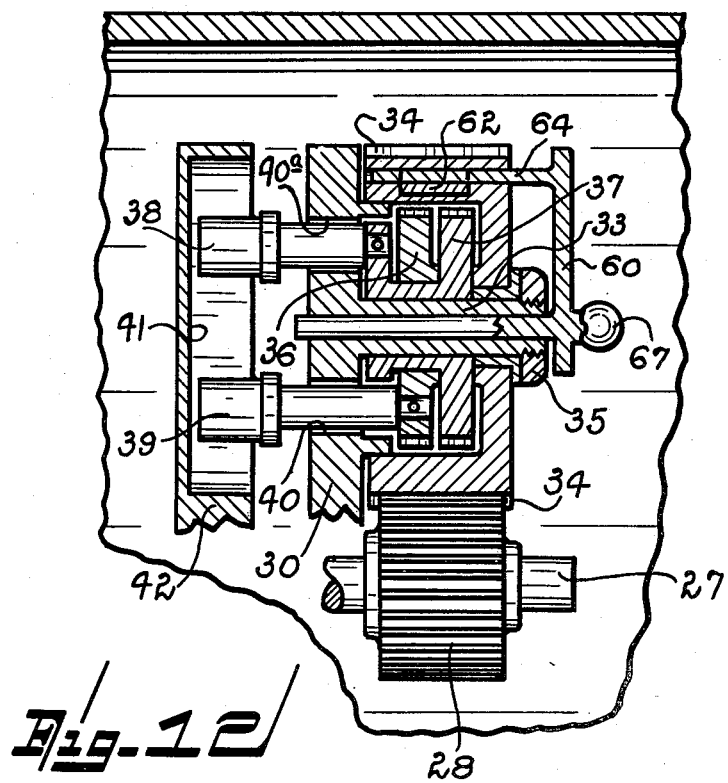
Fig. 12
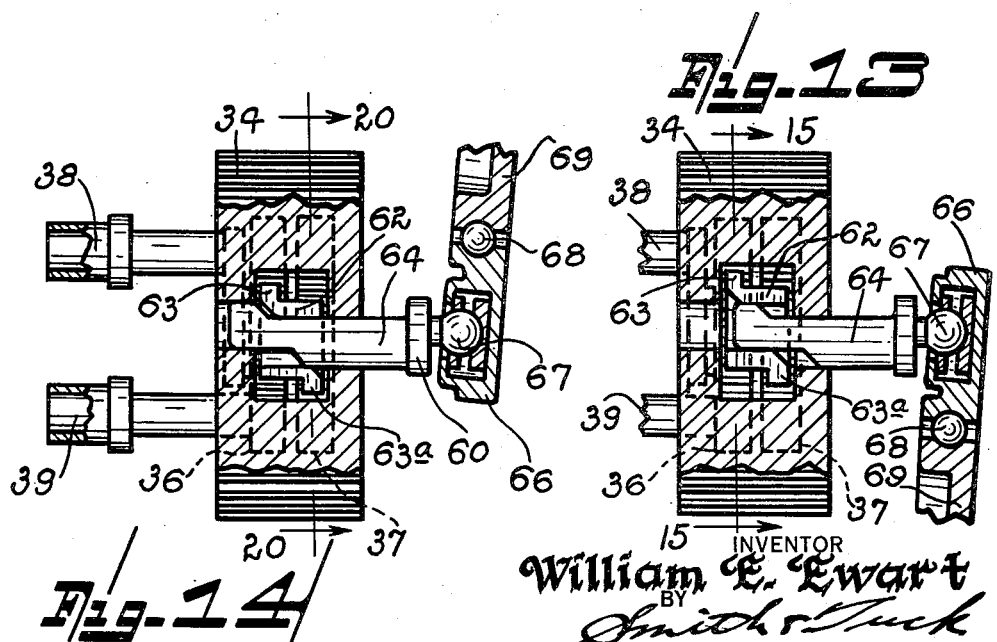
Fig. 13
Fig. 14
INVENTOR
William E. Ewart
BY
Smith & Tuck
ATTORNEYS

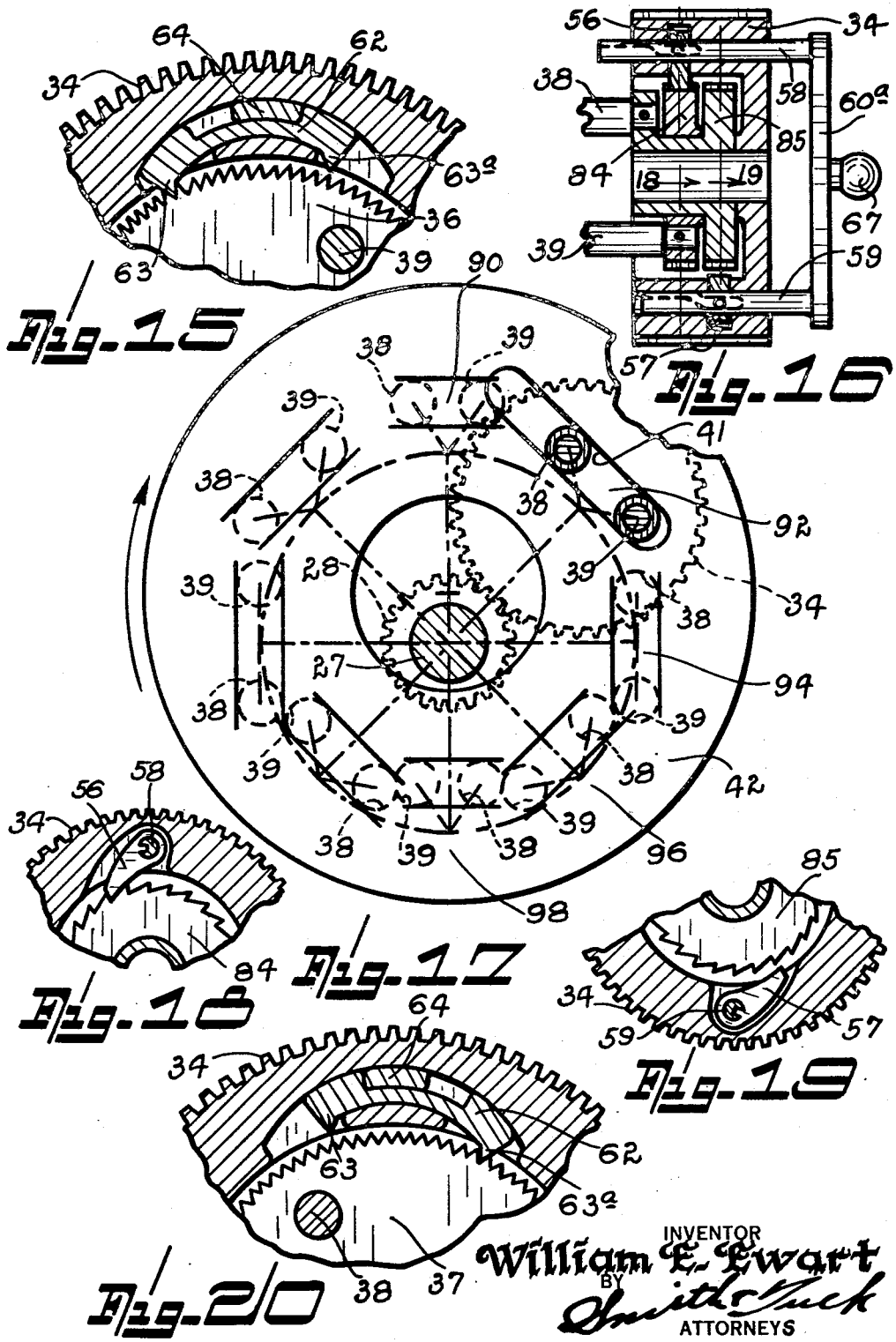

Patented Nov. 7, 1939

2,178,784

UNITED STATES PATENT OFFICE 2,178,784

VARIABLE SPEED TRANSMISSION

William E. Ewart, Seattle, Wash.

Application November 17, 1937, Serial No. 175,132

13 Claims. (Cl. 74—115)

My present invention relates to the art of power transmission devices and more particularly to a variable speed transmission.

In many lines of endeavor and especially in industry there is increasing demand for a speed changing mechanism that is capable of making small variations in speed between two rotating shafts. This is true in various forms of conveyors for changing the speed of feeding different types of materials to machine equipment and particularly is such a means very desirable in the control of internal combustion engines in automobile, trucks, and the like, and especially in the Diesel engines which are normally designed to operate most efficiently at some definite speed.

My present equipment is designed to fill this need. It provides quite a latitude of speed changes in under-drive and over-drive and these changes can be made in very small steps thus effecting speed variations that cannot be practically attained by any gear shifting arrangement unless a very large number of change gears are provided. In fact to provide a gear box using shifting gears would require so bulky a transmission as to be impractical. On the other hand my present variable speed transmission contains in a single small housing, the means for a substantial range of speeds having virtually an infinite number of intermediate ratios.

The principal object of my present invention is, therefore, to provide in a compact, economically constructed unit, a speed changing mechanism giving an over-drive and an under-drive with a large number of intermediate ratios all controllable by a single lever.

A further object of my present invention is to provide a variable speed transmission wherein the desired ratios can be selected while the device is under load.

Other and more specific objects will be apparent from the following description taken in connection with the accompanying drawings, wherein Figure 1 is a longitudinal, vertical, sectional view through my variable speed transmission.

Figure 2 is a side elevation of a transmission made after the teachings of my present invention showing the control means employed with the same.

Figures 3, 4, 5, 6, 7, 8, 9, 10, and 11 are cross-sectional views, in elevation, taken along the similarly numbered lines of Figure 1.

Figure 12 is a fragmentary, sectional view, through my preferred ratchet assembly showing the control means therefor.

Figures 13 and 14 show the pawl shifting means employed to control the ratchet used in my device.

Figure 15 is a fragmentary, sectional view in elevation taken along the line 15—15 of Figure 13.

Figure 16 is a fragmentary view illustrating some of the parts of Figure 12 with the control means therefor, but showing a modified ratchet assembly.

Figure 17 is a view taken substantially along the line 8—8 of Figure 1 showing diagrammatically successive steps in the operation of my device.

Figure 18 is a fragmentary, sectional view, in elevation, taken along the line 18—18 of Figure 16.

Figure 19 is a fragmentary sectional view, in elevation, taken along the line 19—19 of Figure 16.

Figure 20 is a fragmentary, sectional view in elevation similar to Figure 15, taken along the line 20—20 of Figure 14.

Figure 1:
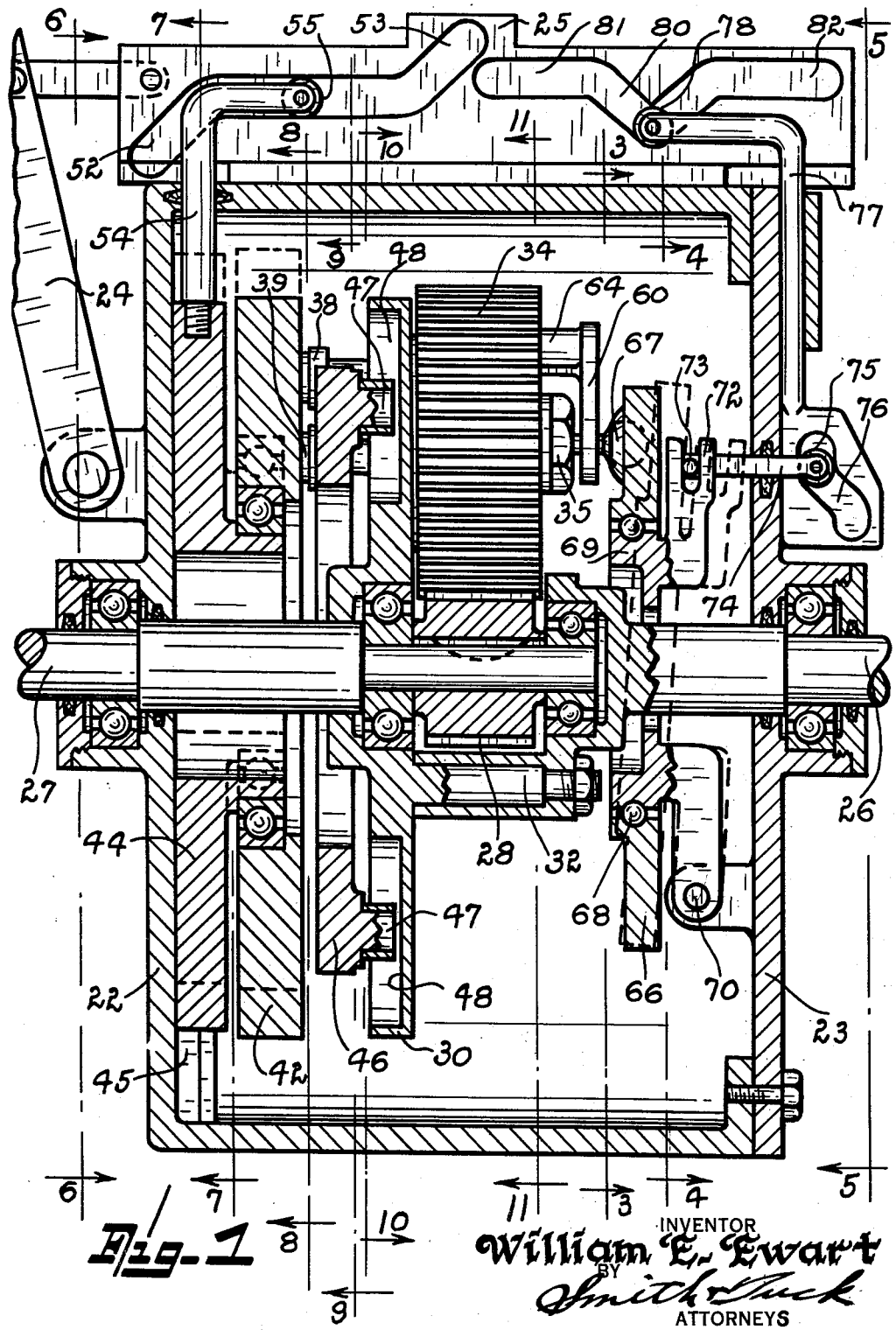
Figure 6:
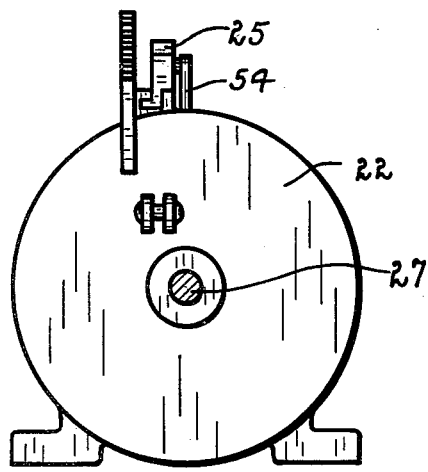

Referring to the drawings, throughout which like reference characters indicate like parts, 22 designates the main housing of my transmission. This and the coacting cover plate 23 provide a grease or oil tight housing for the speed changing mechanism, and further serves as the support for the controlling lever 24 and the control cam assembly 25. Suitably supported in a coaxial arrangement within housing 22 are the driving shaft 26 and the driven shaft 27. These are provided with, preferably, anti-friction bearings as indicated with the necessary oil seals to preserve proper lubrication.

Fixedly secured to shaft 27 is the driven gear 28; this gear is further supported by, preferably, anti-friction bearings as indicated in Figure 1. Suitably supported on shaft 27 is the driving gear supporting plate 30.

Figure 7:
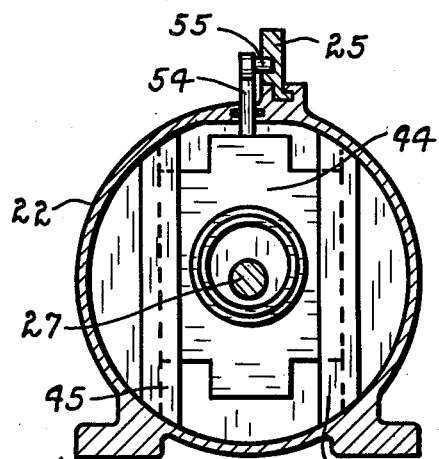
Figure 9:
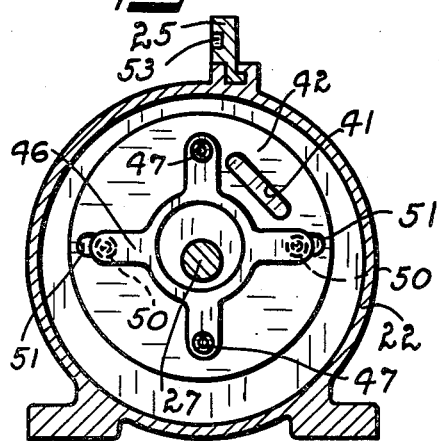
Figure 8:
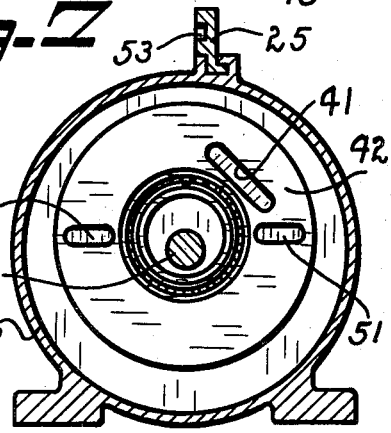
Figure 11:
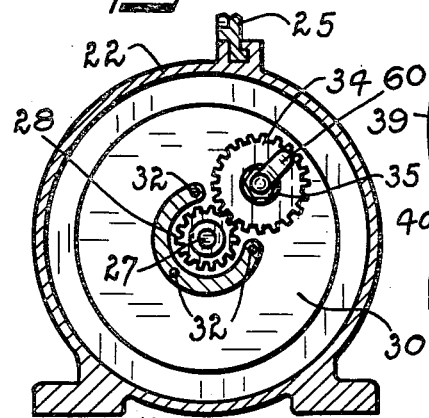
Figure 10:
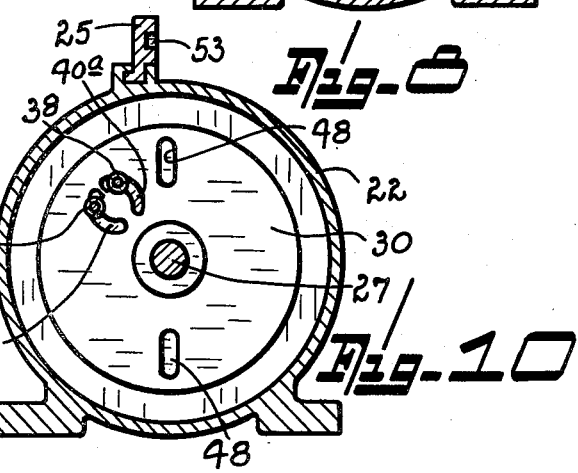

Plate 30 is secured as by stud 32 to an enlargement of the driving shaft 26 so that it will at all times turn with shaft 26. Formed as part of plate 30, or as a member secured thereto, is the hollow shaft 33. This shaft in turn journals the driving gear 34 which is suitably secured thereto by nut 35. Gear 34 is bored out so as to provide a housing for the two ratchet wheels 36 and 37. These ratchets are disposed for limited revolution and have fixedly secured to them the roller, bushed actuating pins 38 and 39. This construction is best illustrated in Figures 12 and 16. These pins pass through slots 40 and 40a in plate 30 and operatively engage slot 41 formed in plate 42. Plate 42 is revolvably mounted, as by the anti-friction bearing shown, on the shiftable plate 44. This plate is shown in its direct drive position in Figure 1 and in its raised, or over-drive position, in the remainder of the views. Plate 44, as will probably be best understood from Figure 7, is in effect a slipper, or sliding, plate guided in guides 45 which are formed as part of housing 22. Disposed between plates 30 and 42 is the coupling spider 46 which is provided with two rollers 47 which engage in slots 48 formed in plate 30 and, on its opposite side shown in Figure 9, it has two rollers 50 which engage slots 51 formed in plate 42. This member forms a coupling between the movable plate 42 and plate 30 which is fixed for rotation about the axis of shafts 26 and 27.

Plate 44 is disposed to be moved upwardly by cam slot 52 for the over-drive position and forced downwardly by the cam slot 53 for the under-drive setting of the transmission. This action is subject to control by lever 24 and is transmitted to plate 44 by means of member 54 which carries a roller 55 operating in the slot cam 52—53.

Disposed within a recess in gear 34 is the double acting pawl 62. This pawl has off-set engaging teeth 63 and 63a as is illustrated in Figures 13 and 14 adapted to alternately engage ratchet wheels 36 and 37. The engagement of pawl 62 is controlled by cam member 64 which is disposed for longitudinal movement and acts after the manner illustrated in Figures 13 and 14, so as to assume the position shown in Figures 15 and 20 in which positions they, in effect, lock gear 34 to either ratchet 36 or 38 according to the stage of the revolution. Yoke 60 which controls the double acting pawl 62 through cam 64 is connected to the control, or wabble plate, 66 to which it is connected by the ball and socket arrangement shown at 67. Plate 66 is disposed for rotation upon the anti-friction bearing 68 by means of which it is supported from member 69, which member in turn is pivoted to cover 23 at 70. On the opposite side of shaft 26 from pivot 70 is a bifurcated arm forming a yoke at 72. Disposed for coaction with yoke 72 is a pin 73 secured to rod 74. Rod 74 is provided at its outer end with a roller 75 adapted to operatively engage the slot cam 76. This cam, through means of rod 77 and roller 78, operatively engages the groove cam 80. This cam has two oppositely disposed cam portions 81 and 82 formed within member 25 and is subject to control by lever 24.

As an alternate arrangement where over-running in one direction only is desirable, I have shown as disposed within the driven gear 34, ratchet pawls 56 and 57 probably best illustrated in their location in Figure 16 and further illustrated in Figures 18 and 19. Pawls 56 and 57 are slidably mounted upon pins 58 and 59, respectively, which are secured to yoke member 60a and are, by the curved key arrangement shown in dotted lines in Figure 16, subject to alternate engagement with over-run ratchet gears 84 and 85.

*Method of operation*

Figure 1 is a vertical cross-sectional view of the device shown in the direct drive position. The gears 28 and 34 are locked in a stationary position to each other and the internal mechanism revolves as a whole. In the rest of the views the device is shown in an over-drive position; that is, the driven shaft will revolve faster than the driving shaft as shown in Figure 1. To get the device in this over-drive position lever 24 is pulled to the left as viewed.

The first action is that wabble plate 66 assumes the position as shown in the dotted lines in Figure 1 by the action of roller 78 going up groove 82 which lifts roller 75 riding in groove 76 and pulls rod 74 to the right to place wabble plate 66 at a predetermined angle. This angle of the wabble plate is always the same no matter to what ratio of over-drive or under-drive the mechanism is adjusted.

The sliding plate 44 will then be set to the desired position by roller 55 being set at any predetermined position on incline 52 which governs the amount this plate is lifted and this displacement governs the degree of overdrive which the mechanism will assume.

Plate 44 then will be eccentric to the axis of the shafts 26 and 27. This plate has member 42 revolvably secured to it and the latter is coupled to the rest of the revolving members, which are concentric to the driving and driven shafts, by the spider coupling 46 which has two rollers engaged in member 42 and two rollers engaged in member 30. These rollers ride in slots.

Plate 42 has a groove 41 cut in its face at an angle of 45 degrees to the universal coupling grooves.

Referring to Figure 1: The ball connector 67 revolves with the mechanism, being secured by a ball and socket arrangement in wabble plate 66. In its intermediate position ball 67 is stationary to the mechanism but when the wabble plate is set at an angle the ball 67 will reciprocate back and forth from an extreme position to the right, as is shown in Figure 13, to the extreme left position, as is shown in Figure 14. As the ball reciprocates it moves cam member 64 back and forth during each revolution of the device. This acts by a cam action on pawl member 62. This member has two dogs 63 and 63a which alternately engage the two toothed wheels 36 and 37. This action is changed from one wheel to the other almost instantaneously when the ball is in an intermediate position on the wabble plate. Therefore, one or the other of the toothed wheels is in a locked relationship to the spur gear 34. When changing, both pawls are slightly in mesh with the two toothed wheels.

Referring to Figure 17, a diagrammatic view, roller 39 is secured to toothed wheel 36 and roller 38 is secured to toothed wheel 37. Groove 41 will rotate in an off-center relationship to the driven shaft.

After further rotation, as indicated in Figure 17, the ratchets change at position 90 and roller 38 and toothed wheel 37 are in a locked relationship to the spur gear 34. At point 92 the roller has been forced ahead by the cam action of the groove 41 on roller 38. This has moved gear 34 ahead through means of the locked pawl and toothed members. It moves the gear at points 94 and 96. When the rollers reach point 98 the ratchets change by the action of the ball assembly 67, being in an intermediate position on the wabble plate, and then roller 39 carries the driving of the device through one-half revolution. This roller is forced ahead also until position 90 is reached where the rollers are again changed and roller 38 carries the driving load.

The amount which gear 34 moves ahead is governed by the amount the rollers are forced to move in groove 41. If plate 42 bearing the groove 41 is raised higher, the rollers will move further, if the groove is lowered below the driving shafts the rollers will allow the gear 34 to drop back or lose speed on each revolution and the driven shaft will rotate at a lower gear ratio, or underdrive, thus having greater torque.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

Having thus fully described my invention what I claim as new and desire to secure by Letters Patent is:

1. In a variable speed power transmission the combination of, axially aligned driving and driven shafts, a driven gear secured to said driven shaft; a driving gear disposed for revolution about the axis of said driving and driven shafts; supporting means for said driving gear fixedly secured to said driving shaft; a revolvable plate disposed substantially coaxial with said shafts; means for positioning said plate to selectively provide concentric positioning or eccentric positioning with respect to said shafts; self aligning driving means adapted to operatively couple said revolvable plate and the said support for the driving gear; clutching means adapted to operatively connect said driving gear with said revolvable plate and means for operating said clutching means.

2. In a variable speed power transmission the combination of, axially aligned driving and driven shafts; a driven gear secured to said driven shaft; a driving gear disposed for revolution about the axis of said driving and driven shafts; supporting means for said driving gear fixedly secured to said driving shaft; a revolvable plate disposed substantially coaxial with said shafts; means for sliding said plate to provide coaxial positioning or to provide eccentric positioning; self-aligning driving means adapted to operatively couple said revolvable plate and the said support for the driving gear; clutching means adapted to operatively connect said driving gear with said revolvable plate and means on said plate adapted to advance or retard said driving gear, and means for operating said clutching means.

3. In a variable speed power transmission the combination of, axially aligned driving and driven shafts; a driven gear secured to said driven shaft; a driving gear disposed for revolution about the axis of said driving and driven shafts; a supporting means for said driving gear disposed to revolve with said driving shaft; a revolvable plate disposed substantially coaxial with said shafts; means for sliding said plate to provide coaxial positioning or to provide eccentric positioning; self-aligning driving means adapted to operatively couple said revolvable plate and the said support for the driving gear; dual ratchet wheels, housed within said driving gear, adapted to alternately operatively connect said gear with said revolvable plate and means on said plate adapted to advance or retard said driving gear and a slidable cam disposed to alternately enegage said ratchet wheels.

4. In a variable speed power transmission the combination of, axially aligned driving and driven shafts; a driven gear secured to said driven shaft; a driving gear disposed for revolution about the axis of said driving and driven shafts; supporting means for said driving gear fixedly secured to said driving shaft; a revolvable plate disposed substantially coaxial with said shafts; means for sliding said plate to provide coaxial positioning or to provide eccentric positioning; self-aligning driving means adapted to operatively couple said revolvable plate and the said support for the driving gear; dual clutching means disposed co-axially with said driving gear; pins, secured to said clutching means, operating through a slot in said support and engaging a slot in said revolvable plate to provide means adapted to advance or retard said driving gear and means for actuating said clutching means.

5. In a variable speed power transmission the combination of, axially aligned driving and driven shafts, a driven gear secured to said driven shaft; a driving gear disposed for revolution about the axis of said driving and driven shafts; supporting means for said driving gear fixedly secured to said driving shaft; a revolvable plate disposed substantially coaxial with said shafts; means for positioning said plate to provide concentric positioning or eccentric positioning with respect to said shafts; self-aligning driving means adapted to operatively couple said revolvable plate and the said support for the driving gear; clutching means adapted to operatively connect said driving gear with said revolvable plate and means for operating said clutching means consisting of a cam actuated by a wabble plate, subject to external adjustment, through a universal coupling means.

6. In a selective-speed transmission gearing, the combination with a stationary housing, a drive-shaft and an alined driven-shaft journaled therein, a driven-gear on the driven-shaft, a driving-head rotatable with the drive-shaft, and a planetary driving-gear journaled on the driving-head, of a transversely slidable plate mounted in the housing and operating means therefor, a rotary-disk journaled on said plate, a transversely movable coupling-spider between the drive-head and said disk, means operatively engaging said drive-head and coupling-spider, and means operatively engaging said spider and disk, dual clutching means adapted to connect said driving head and said driving-gear, and means for actuating said clutching means.

7. In a planetary gearing as described, the combination with a rotary driving-head having radial slots, a rotary disk having a transversely movable journal bearing and opposed arcuate slots in said disk, of a transversely movable spider-coupling between said head and disk having opposed spaced arcuate slots, and anti-friction rollers on the spider-coupling engaged in said radial slots, a driving gear journaled on the driving-head, a driving clutch mounted in said gear, and said clutch including a pair of anti-friction rollers engaged in said arcuate slots and means for actuating said clutch.

8. In a selective speed transmission gearing, the combination with a stationary housing, a drive shaft and a driven shaft, a drive-head, and a driven-gear, of a planetary drive gear mounted on the head and a drive-clutch in said gear and actuating means for said clutch, a rotary disk having a transversely movable journal bearing, a spider-coupling intermediate said head and disk, operating connections between said head and spider, operating connections between said clutch and disk, and means for actuating the clutch.

9. In a selective speed transmission gearing, the combination with a stationary housing and a drive-shaft and a driven-shaft journaled therein, a transversely movable slide-plate mounted in the housing, and means for moving said plate to eccentric position, of a drive-head on the drive shaft and a planetary drive gear journaled on the head, a driven-gear engaged by said drive gear, a rotary disk journaled on the plate to move therewith, a coupling member between said head and disk, operative connections between said head and member, means operatively engaging said disk and coupling, a clutch device mounted within the drive gear and actuating means therefor, and operative connections between said clutch device and said disk.

10. In a selective speed transmission gearing, the combination with a stationary housing, a drive-shaft and its drive-head and a drive gear journaled on the head, a transversely movable slide plate mounted in the housing, a driven gear engaged by said drive gear and means for moving said plate to eccentric position, of a rotary disk journaled on the plate, a rotary coupling between said head and disk, operatively connecting said head and disk, a clutch device mounted within the drive gear and means for actuating said device, and operative connections between said clutch device and said disk.

11. In a selective speed transmission gearing, the combination with a housing, a drive shaft and its head, a planetary gear journaled on the head and a driven gear engaging said planetary gear, of a transversely movable slide plate and means for moving said plate to eccentric position, a rotary disk journaled on the plate and having a pair of spaced opposed radial slots, said head having radial and arcuate slots, a rotary coupling between said head and disk, rollers journaled on said coupling and movable in the radial head-slots, a clutch device mounted within the drive-gear and actuating means therefor, and a pair of rollers journaled in the clutch device for engagement with the arcuate slots.

12. In a selective speed transmission gearing, the combination with a housing, a drive shaft and its head having radially opposed, and arcuate slots, and a planetary gear journaled on the head and a driven gear engaging said planetary gear, of a transversely movable rotor having a pair of opposed radial slots and means for moving said rotor to eccentric position, a rotary coupling between said head and rotor, rollers journaled on the coupling and movable in the radial slots of the head, a pair of ratchet wheels journaled in the gear and pawls therefor, means for engaging the pawls with the wheels, and rollers mounted on said wheels and movable in the arcuate slots.

13. In a selective speed transmission gearing, the combination with a housing, a drive shaft and its head having radially opposed, and arcuate slots, a planetary gear journaled on the head and a driven gear engaging said planetary gear, of a transversely movable rotor having a pair of opposed radial slots and means for moving said rotor to eccentric position, a rotary coupling between said head and rotor, rollers journaled on the coupling and engaged in the radial slots of the head, a pair of ratchet wheels mounted in the gear and means for alternately rotating the wheels, laterally extending pins on said wheels, and rollers on the pins movable in the arcuate slots.

WILLIAM E. EWART.